(12) United States Patent
Osburn

(10) Patent No.: US 7,707,764 B1
(45) Date of Patent: May 4, 2010

(54) LIGHT EMITTING FISHING LURE

(75) Inventor: Doug Osburn, League City, TX (US)

(73) Assignee: Wasabi, LLC., Houston, TX (US)

( * ) Notice: Subject to any disclaimer, the term of this patent is extended or adjusted under 35 U.S.C. 154(b) by 355 days.

(21) Appl. No.: 11/627,665

(22) Filed: Jan. 26, 2007

(51) Int. Cl.
*A01K 85/01* (2006.01)

(52) U.S. Cl. .......................... 43/17.6; 43/17.5; 43/42.24

(58) Field of Classification Search .................. 43/17.5, 43/17.6, 42.1, 42.24, 42.32, 42.33, 42.34
See application file for complete search history.

(56) References Cited

U.S. PATENT DOCUMENTS

| | | | | |
|---|---|---|---|---|
| 4,175,348 A | * | 11/1979 | Ray | ............................ 43/17.6 |
| 4,669,213 A | * | 6/1987 | LeRoy | ........................ 43/17.6 |
| 5,461,815 A | * | 10/1995 | Rodgers | ..................... 43/17.6 |
| 6,029,388 A | * | 2/2000 | Yokogawa et al. | ........... 43/17.6 |
| 6,286,246 B1 | * | 9/2001 | Rachal et al. | ............. 43/42.25 |
| 6,922,935 B2 | * | 8/2005 | Yu | .............................. 43/17.6 |
| 7,137,222 B2 | * | 11/2006 | Aanenson | ................... 43/42.31 |
| 2004/0200122 A1 | * | 10/2004 | Aanenson et al. | ............ 43/17.6 |
| 2004/0244265 A1 | * | 12/2004 | Miyata et al. | ................ 43/17.6 |

* cited by examiner

*Primary Examiner*—David J Parsley
(74) *Attorney, Agent, or Firm*—Buskop Law Group, PC; Wendy Buskop

(57) ABSTRACT

A light emitting fishing lure comprising: a translucent lure head having a cylindrical lure cavity passing longitudinally through the translucent lure head, a charging terminal located within the cylindrical lure cavity, an enable terminal located within the cylindrical lure cavity and electrically isolated from the charging terminal, a ground terminal located within the cylindrical lure cavity and electrically isolated from the charging terminal and from the enable terminal, an energy source, a control circuit board, a light emitting circuit board, and a convex lens formed by the outside surface of the translucent lure head; a leader secured to a fishing line and extending through the charging terminal, the enable terminal, and the ground terminal, in the cylindrical lure cavity and connecting to a fish hook; a lure skirt attached to the translucent lure head.

19 Claims, 5 Drawing Sheets

LIGHT EMITTING FISHING LURE

FIELD

The present embodiments relate to a light emitting fishing lure.

BACKGROUND

Little is know of the life cycle of pelagic fish such as marlin, swordfish, sailfish, and tuna which have enormous economic and food value. These fish are believed to swim great distances crossing oceans and many international marine management jurisdictions over periods of weeks and months, but nothing is known of the motivation for this migratory behavior. The adaptation of these fish to the open ocean is so complete, marine biologists have had very little success maintaining healthy specimens in captivity for extended studies.

Much of what is known or believed regarding these animals has been gleaned from the experience and records of conservation minded sportsmen who fish for them. With regard to their feeding habits, it is believed by sportsmen that billfish such as marlin and sailfish locate prey by sight near the ocean surface and do not feed under the low light conditions of ocean depths or at night. As a result, no fishing lures have been developed for use under these low light conditions.

However, during periods of darkness, deepwater marine animals such as squid, which are known to be a significant fraction of the pelagic fish diet, rise in the water column to intermediate depths, and sometimes the surface, where they are more accessible to feeding fish. Additionally, a key visual attraction of these deepwater marine animals is the ability of their bodies to generate light when stressed or excited. This light generation capability is called bioluminescence. A fishing lure designed for these low light conditions that simulates bioluminescence will prove to be highly effective in catching pelagic fish.

A need exists for a fishing lure capable of two fish attracting modes. In one mode, selectively focused, directed emitted light simulates the appearance and motion of baitfish under daylight conditions. In a second mode, selectively focused and sequenced, directed emitted light simulates the bioluminescence of deepwater marine animals under low light conditions such as darkness or a subsurface ocean depths.

A further need exists for a fishing lure capable of using a variety of energy sources that can be replaceable or rechargeable.

A need exists for a fishing lure containing circuitry that can create emitted light in flashes or patterns that can attract specific marine game fish.

A need also exists for a fishing lure that can be adapted to produce light of varying colors and intensities.

A further need exists for a simplified fishing lure possessing circuitry that allows the lure to automatically self-illuminate in the presence of seawater and automatically cease illumination when removed from seawater.

The present embodiments meet these needs.

BRIEF DESCRIPTION OF THE DRAWINGS

The detailed description will be better understood in conjunction with the accompanying drawings as follows.

Figure 1:
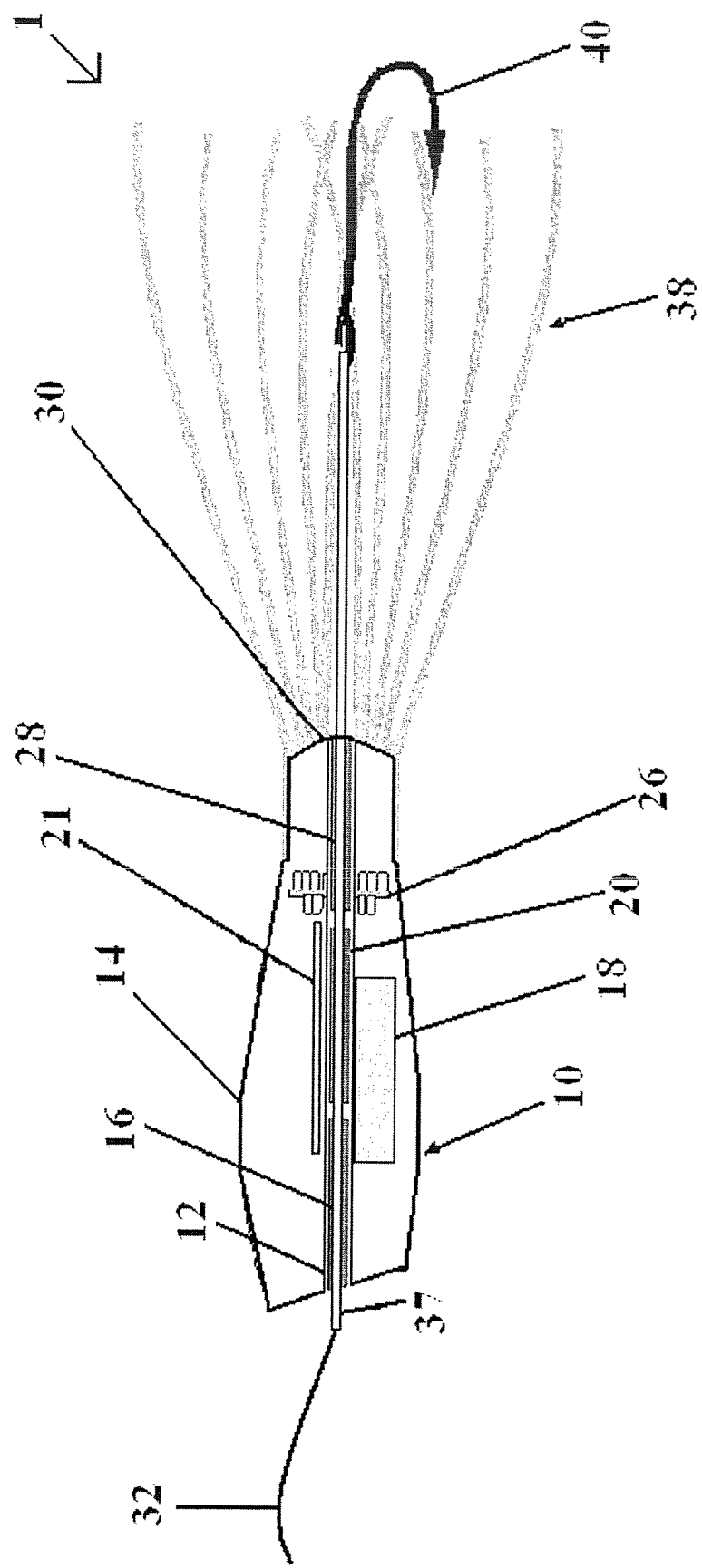
FIG. 1 depicts a cross-sectional view of an embodiment of the light emitting fishing lure.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a light emitting fishing lure.

Light emitting fishing lures are typically capable of attracting increased fish attention, resulting in successful and productive fishing for both recreational and commercial purposes. More productive and more efficient fishing can result in an increased food supply in many communities, and an improved economy, especially in coastal communities.

The present fishing lure possesses circuitry capable of providing continuous light, flashing light, and light that is emitted in patterns and sequences, to increase fish attention and attract marine game fish such as marlin, swordfish, sailfish, bluefin tuna, yellowfin tuna, and others. The present lure can also be adapted to emit different pulsating or flashing lights during daylight or nighttime operation.

The circuitry and terminals within the light emitting fishing lure are encapsulated such that they are mostly surrounded by a translucent lure head, providing partial protection from marine elements, protecting the circuitry and terminals from damage due to handling or transport, and preventing damage that can be caused by large and aggressive game fish.

The positioning of the light emitting circuitry in the present embodiment is such that the emitted light illuminates a translucent lure head and a lure skirt attached to the rear of the translucent lure head. The majority of the emitted light is focused on the tail or lure skirt, which highlights the motion of the tail, more effectively imitating marine baitfish. The rear portion of the translucent lure head can act as a convex lens in order to focus the emitted light on the entire lure skirt.

The lure skirt and lure head of the present embodiment can be tinted in different colors to mimic different marine animals. The lure head and lure skirt can also be tinted with phosphorescent material that will emit additional light when stimulated by light emitted from the circuitry.

The light emitting fishing lure can also contain one or more light emitting diodes of varying colors and intensities that can be individually, sequentially, or simultaneously operated.

The embodied light emitting fishing lure can also be self-illuminating, possessing circuitry that is completed when the lure contacts water, including seawater, causing use of the lure to be a very simple task requiring very little preparation, maintenance, or activity beyond the acts normally undertaken when fishing. This further provides the advantage of eliminating the need for mechanical switches and electrical connectors, which can quickly become damaged or inoperable when exposed to the corrosive marine environment.

The present light emitting fishing lure can also have charging circuitry and can utilize rechargeable power sources, or the lure can be equipped with replaceable power sources.

The light emitting fishing lure has a translucent lure head. The lure head can be made from urethane, clear vinyl, clear epoxy resin, polyester, acrylic, or other similar materials. The translucent lure head can range from three inches to seven inches in length can be generally cylindrical, teardrop-shaped, or bullet-shaped. A contemplated embodiment of the translucent lure head is approximately 6.28 inches in circumference, 2 inches in width, and 5.4 inches in length.

The translucent lure head has a cylindrical lure cavity passing longitudinally through the translucent lure head for receiving a leader. The leader passes through the translucent lure head and can be attached to a fishing line and a hook. The cylindrical lure cavity also contains electrical terminals and can fill with water when the light emitting fishing lure is submerged, allowing a completed circuit to be formed between the electrical terminals. The cylindrical lure cavity can have a diameter ranging from 0.18 inches to 0.25 inches.

The translucent lure head also has an outside surface, which can be smooth or textured and made from an industrial polymer.

The outside surface of the translucent lure head can be tinted one or more colors to affect the color of the emitted light. It is also contemplated that the outside surface can be tinted with phosphorescent material to emit additional light when stimulated by light from the light emitting fishing lure.

It is further contemplated that the translucent lure head can be selectively tinted in its entirety, or only partially, such that parts of the translucent lure head color emitted light or emit additional light while other parts of the translucent lure head remain essentially transparent.

In an embodiment, the forward portion of the translucent lure head can be tinted with phosphorescent material while the back portion of the translucent lure head is clear and transparent. This creates the appearance of a florescent glowing effect in the translucent lure head while focusing the maximum amount of light on the lure skirt. This arrangement possesses attractive qualities for game fish.

The outside surface of the translucent lure head can also be shaped to focus or direct the emitted light.

A charging terminal can be located within the cylindrical lure cavity. A charging terminal is an electrically conductive tube and can be made from brass, stainless steel, or other similar materials.

An enable terminal, which is an electrically conductive tube, can also be located within the cylindrical lure cavity. The enable terminal can be electrically isolated from the charging terminal. The enable terminal can be made from brass, stainless steel, or other similar materials.

A ground terminal can also be located within the cylindrical lure cavity, and can be electrically isolated from the charging terminal and from the enable terminal. The ground terminal is an electrically conductive tube and can be made from brass, stainless steel, or other similar materials.

It is contemplated that the charging terminal, the enable terminal, and the ground terminal can be partially encapsulated by the translucent lure head for protecting the charging terminal, the enable terminal, and the ground terminal from damage, such as that caused by handling, transport, or aggressive game fish. The charging terminal, the enable terminal, and the ground terminal can be encapsulated such that each terminal remains exposed to the cylindrical lure cavity, but protected from objects exterior to the light emitting fishing lure.

The translucent lure head can further have an energy source encapsulated by the translucent lure head. The energy source can be a replaceable energy source. It is also contemplated that the energy source can be a rechargeable energy source. In an embodiment, the energy source can be a nickel metal hydride battery or a lithium ion battery, such as 1000 mA hour, AAA NiMH batteries made by Duracell.

The translucent lure head further has a control circuit board, such as DOSP-1 made by AutoSol, which can have an excitation circuit, a charging circuit, or combinations thereof disposed thereon and encapsulated by the translucent lure head. The translucent lure head also has a light emitting circuit board such as DOSP-LED made by AutoSol, encapsulated by the translucent lure head.

The light emitting circuit board can have one or more light emitting diodes or similar light emitting elements that can be white, one or more colors, or combinations thereof. The light emitting circuit board can also have elements capable of emitting multiple colors and intensities of light.

The light emitting diodes or other light emitting elements can also be separately encapsulated within the translucent lure head.

The energy source, the control circuit board, and the light emitting circuit board can be encapsulated by the translucent lure head such that they are sealed from contact with water when the light emitting fishing lure is submerged.

The control circuit board can further comprise an excitation circuit, such as DOSP-5.DSN made by AutoSol, a charging circuit, such as DOSP-5.DSN made by AutoSol, or combinations thereof, disposed on the control circuit board. The excitation circuit or charging circuit can also be separately encapsulated in the translucent lure head.

The translucent lure head can further comprise a convex lens formed by the outside surface of the translucent lure head. The convex lens focuses the majority of the light emitted by the light emitting circuit board toward the head and tail of the emitting lure.

The translucent lure head can be faceted, to affect its appearance while emitting light to better attract fish attention, and to focus and direct light emitted by light emitting diodes or similar elements. The translucent lure head can also have shapes molded in cabochon to affect its appearance and attract specific game fish.

The light emitting fishing lure further comprises a leader, which can be secured to a fishing line that extends through the charging terminal, the enable terminal, and the ground terminal, in the cylindrical lure cavity, and can connect to a fish hook.

The leader can be made from 300 pound test to 600 pound test monofilament line, and is generally from 10 feet to 20 feet in length.

The light emitting fishing lure can also have a lure skirt attached to the translucent lure head. The lure skirt can be made from plastic, rubber, or similar materials and is generally from 10 inches to 15 inches in length. It is contemplated that a lure skirt can be generally conical in shape, having a plurality of tassels or strands which are moved by currents, a fishing line, and the motion of the light emitting fishing lure while submerged, attracting fish attention.

The lure skirt can be tinted one or more colors to affect the color of the emitted light. It is also contemplated that the lure skirt can be tinted with phosphorescent material to emit additional light when stimulated by light from light emitting diodes or other light emitting elements.

The convex lens formed by the outside surface focuses the majority of the emitted light on the lure skirt, which attracts fish attention by mimicking the appearance and movement of many baitfish.

The enable terminal and ground terminal are electrically isolated such that when submerged in water, especially seawater, the circuits are activated, thereby activating the control circuit board which can then control the illumination of the light emitting circuit board. This can be accomplished through use of an excitation circuit within the control circuit board, or separately disposed within the translucent lure head.

Through this completed circuit, the light emitting fishing lure can automatically self-illuminate when submerged, and automatically cease to illuminate when removed from a water source.

The charging terminal can be electrically isolated such that when connected to a power supply, it will activate and begin to control the recharging of the energy source. This can be accomplished through use of a charging circuit within the control circuit board, or separately disposed within the translucent lure head.

Referring now to FIG. 1, a cross-sectional view of an embodiment of the light emitting fishing lure is depicted.

The light emitting fishing lure 1 has a translucent lure head 10 with an outside surface 14, attached to a lure skirt 38. The translucent lure head 10 has a cylindrical lure cavity 12 passing longitudinally through the translucent lure head 10.

A charging terminal 16, an enable terminal 20, and a ground terminal 28 are disposed within the cylindrical lure cavity 12, such that the charging terminal 16, the enable terminal 20, and the ground terminal 28 are electrically insulated from one another.

A leader 37 is depicted extending through the cylindrical lure cavity 12 of the translucent lure head 10. The leader 37 is shown attached to a fishing line 32 near the front of the translucent lure head 10. The leader 37 is also shown attached to a fish hook 40 near the back of the lure skirt 38.

An energy source 18 and a control circuit board 21 are shown encapsulated in the translucent lure head 10. A light emitting circuit board 26 is encapsulated near the rear of the translucent lure head 10.

The light emitting circuit board 26 may have light emitting diodes or similar light emitting elements. In is also contemplated that light emitting diodes or other light emitting elements may be separately disposed and encapsulated with the translucent lure head 10.

The outside surface 14 forms a convex lens 30 along the rear of the translucent lure head 10. The orientation of the light emitting circuit board 26 within the translucent lure head 10 is such that the majority of the emitted light illuminates the lure skirt 38. The convex lens 30 disperses the emitted light to better illuminate the lure skirt 38 and simulate the appearance and motion of baitfish.

Figure 2:
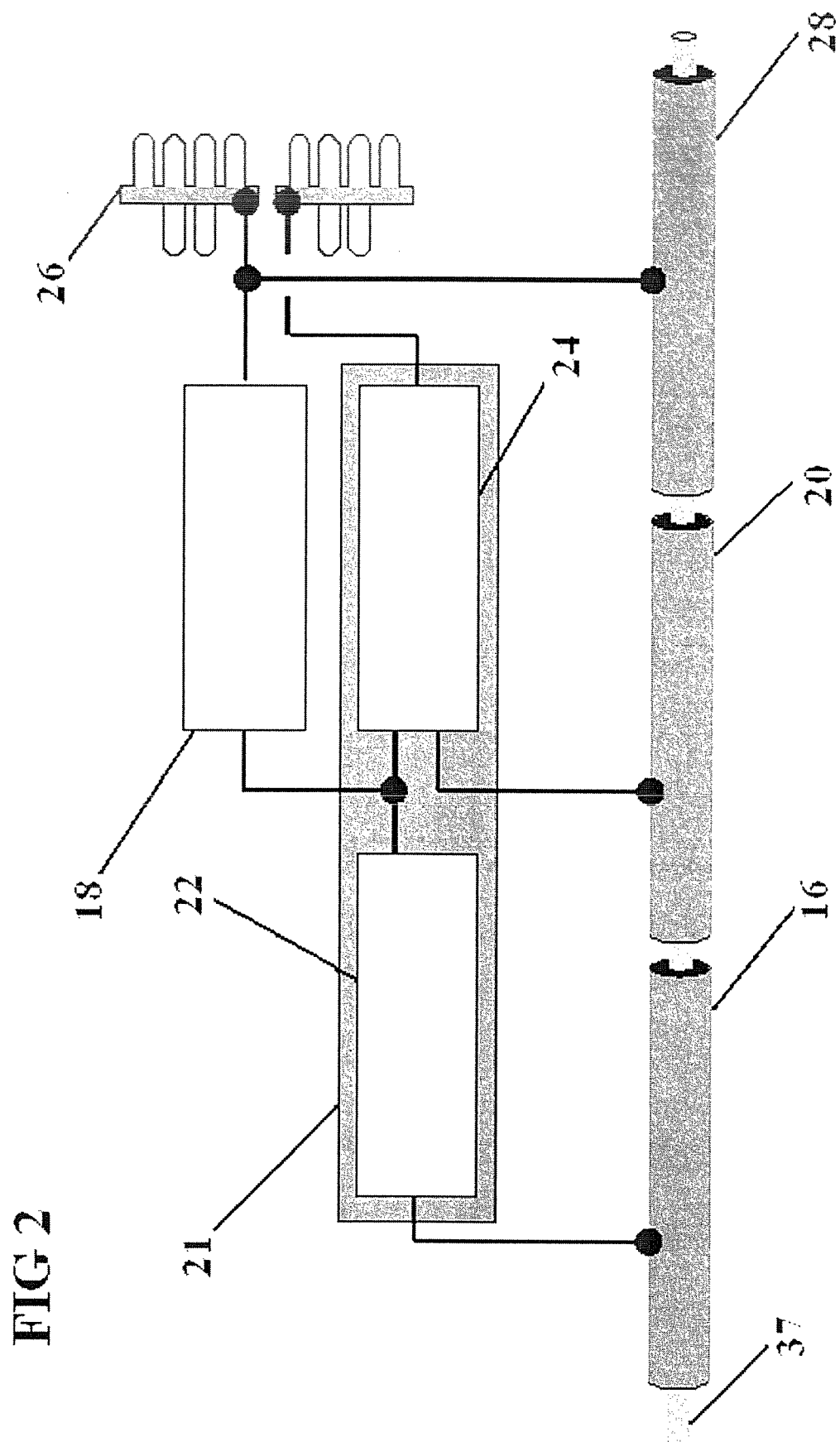
FIG. 2 depicts the circuitry and terminals in the embodiment of the light emitting fishing lure.

Referring to FIG. 2, a schematic of the terminals and circuitry contained within the translucent lure head 10 is depicted.

The leader 37 is shown extending through the charging terminal 16, the enable terminal 20, and the ground terminal 28.

The charging terminal 16 can be connected to a charging circuit 22 within the control circuit board 21. The charging circuit 22 is in turn connected to both an excitation circuit 24 within the control circuit board 21, and an energy source 18. Another embodiment of the light emitting fishing lure 1 can lack a charging circuit.

It is also contemplated that a charging circuit and an excitation circuit can be separately disposed and encapsulated within the translucent lure head 10.

The enable terminal 20 is also connected to the excitation circuit 24. The excitation circuit is connected to the light emitting circuit board 26.

The ground terminal 28 is connected to both the light emitting circuit board 26 and the energy source 18.

This orientation of terminals and circuits allows the presence of water, such as seawater, within the leader 37, the charging terminal 16, the enable terminal 20, and the ground terminal 28, to cause the light emitting fishing lure 1 to automatically activate, causing the emission of light from the light emitting circuit board 26.

When water fills the leader 37, the circuit between the enable terminal 20 and the ground terminal 28 is completed, allowing current from the energy source 18 to travel to the light emitting circuit board 26. This completed circuit also allows the excitation circuit 24, which is part of the control circuit board 21, to control and operate the light emitting circuit board 26.

When the light emitting fishing lure 1 is removed from water, the leader 37, the charging terminal 16, the enable terminal 20, and the ground terminal 28 are emptied of water, breaking the circuit between the enable terminal 20 and the ground terminal 28, causing the light emitting fishing lure to automatically deactivate, ceasing emissions from the light emitting circuit board 26.

Figure 3:
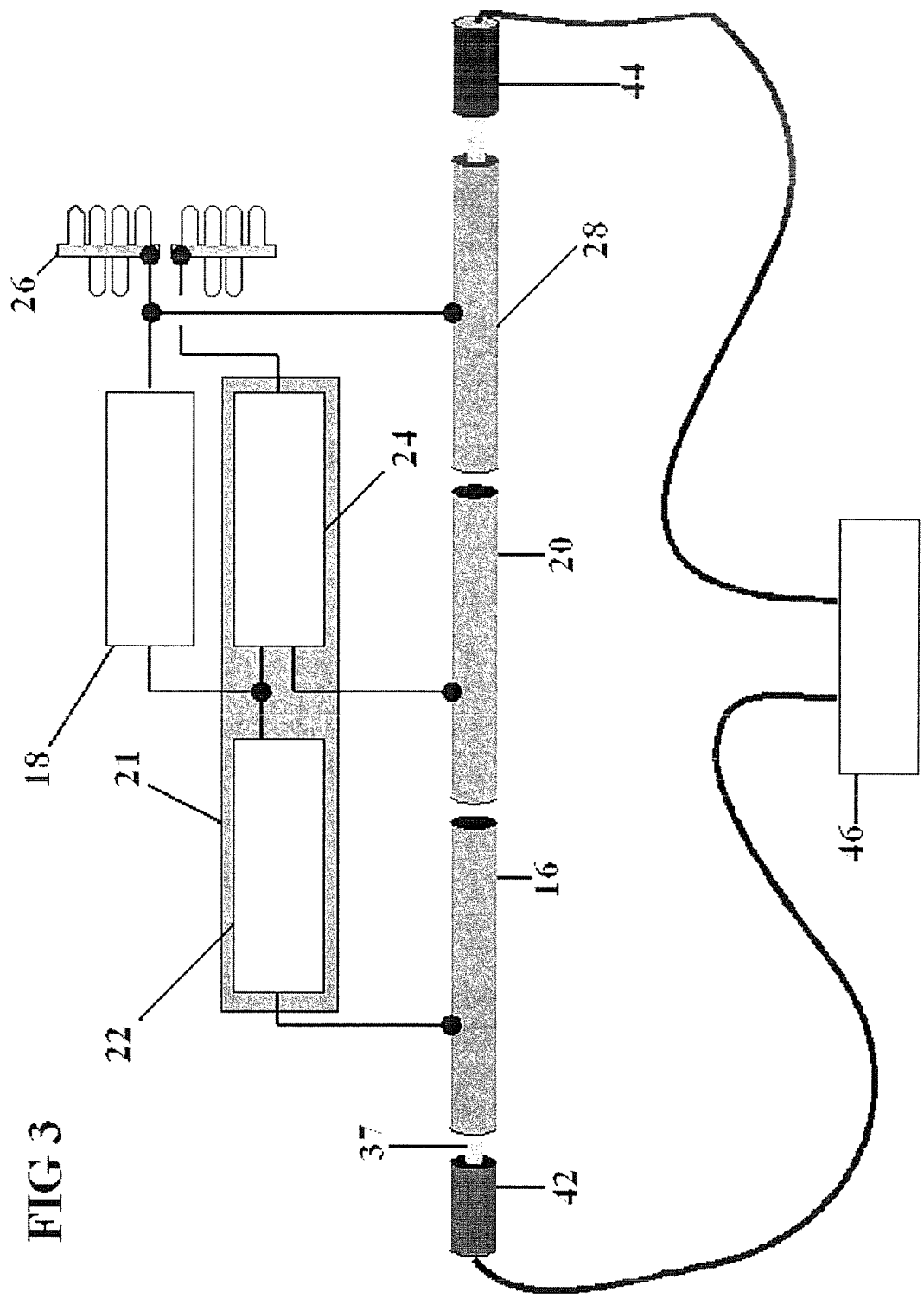
FIG. 3 depicts the circuitry and terminals of the light emitting fishing lure with a charging power supply.

Now referring to FIG. 3, the circuitry and terminals of FIG. 2 are depicted, connected to a charging power supply 46.

As previously described, the leader 37 extends through charging terminal 16, the enable terminal 20, and the ground terminal 28. The charging terminal 16 is connected to the charging circuit 22 within the control circuit board 21. The charging circuit 22 is in turn connected to the excitation circuit 24 and the energy source 18.

The enable terminal 20 is connected to the light excitation circuit 24, which is in turn connected to the light emitting circuit board 26. The ground terminal 28 is connected to both the energy source 18 and the light emitting circuit board 26.

A charging power supply 46, which can have a positive jack 42 and a ground jack 44, is depicted connected to the leader 37. The positive jack 42 is connected to the charging terminal 16, while the ground jack 44 is connected to the ground terminal 28.

This connection completes a circuit between the charging terminal 16 and the ground terminal 28, allowing current to flow from the charging power supply 46 through the charging terminal 16, through the charging circuit 22 within the control circuit board 21, to the energy source 18.

The embodied light emitting fishing lure can be manufactured by first creating an electrical assembly. A ground terminal, a first heat shrink tube, an enable terminal, a second heat shrink tube, and a charging terminal can be slid onto a manufacturing support rod. Similarly, a light emitting circuit board having a central hole can be slid onto the manufacturing support rod and the ground terminal.

Other circuitry and an energy source can be attached to the electrical assembly for support and to maintain position during the manufacturing process, or such elements can be separately encapsulated. After forming the electrical assembly, wiring is soldered to connect the circuits and terminals of the electrical assembly, and the completed electrical assembly is placed in a lure-shaped mold, in which casting material is poured which encapsulates the electrical assembly and forms a light emitting fishing lure once set.

Figure 4:
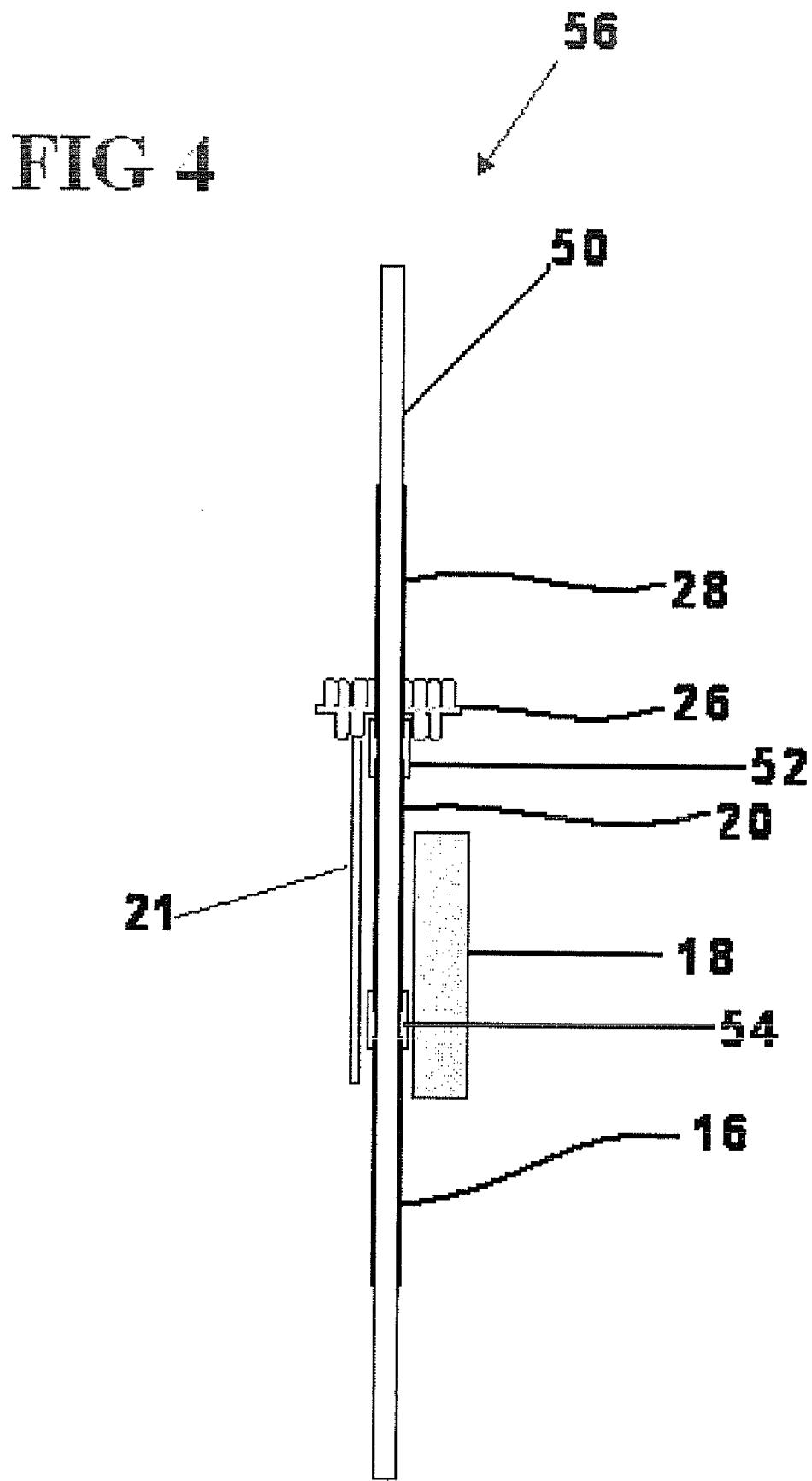
FIG. 4 depicts the circuitry and terminals of the light emitting fishing lure during an embodiment of the manufacturing and assembly process.

Referring to FIG. 4, the circuitry and terminals of the light emitting fishing lure are depicted during an embodiment of the manufacturing and assembly process.

Electrical assembly 56 is begun by sliding three segments of brass or stainless steel tube that are the charging terminal 16, the enable terminal 20, and the ground terminal 28, onto a manufacturing support rod 50, spaced apart such that charging terminal 16, enable terminal 20, and ground terminal 28 span an overall length of approximately 5.41 inches.

Ground terminal 28 is disposed on manufacturing support rod 50 adjacent to a first heat shrink tube 52. Enable terminal 20 is disposed on manufacturing support rod 50 between first heat shrink tube 52 and a second heat shrink tube 54. Charging terminal 16 is disposed on manufacturing support rod 50 adjacent to second heat shrink tube 54. This orientation places enable terminal 20 between ground terminal 28 and charging terminal 16.

An approximately 0.25 inch gap can be maintained between charging terminal 16 and enable terminal 20 by the placement of second heat shrink tube 54, such that when manufacturing support rod 50 is removed after manufacturing, charging terminal 16 and enable terminal 20 are adjacent but not in electrical contact.

Similarly, an approximately 0.25 inch gap is maintained between enable terminal 20 and ground terminal 28 by first heat shrink tube 52 such that when manufacturing support rod 50 is removed after manufacturing, enable terminal 20 and ground terminal 28 are adjacent but not in electrical contact.

Light emitting circuit board 26 is also shown disposed on manufacturing support rod 50, proximate to ground terminal 28. Light emitting circuit board 26 can have a central hole that allows it to slide onto manufacturing support rod 50 and ground terminal 28.

Control circuit board 21 is electrically connected to and held in position by light emitting circuit board 26. Light emitting circuit board 26 and control circuit board 21 can be attached to ground terminal 28 to hold them in place during manufacturing.

Energy source 18, which can be two AAA NiMH batteries that are wired in series and encapsulated in a heat shrink tube, is attached to enable terminal 20 for support during the manufacturing process.

During the manufacturing process, wires are soldered to connect energy source 18, charging terminal 16, and enable terminal 20 to control circuit board 21. Additionally a wire is soldered to ground terminal 28 to connect ground terminal 28 to light emitting circuit board 26.

Figure 5:
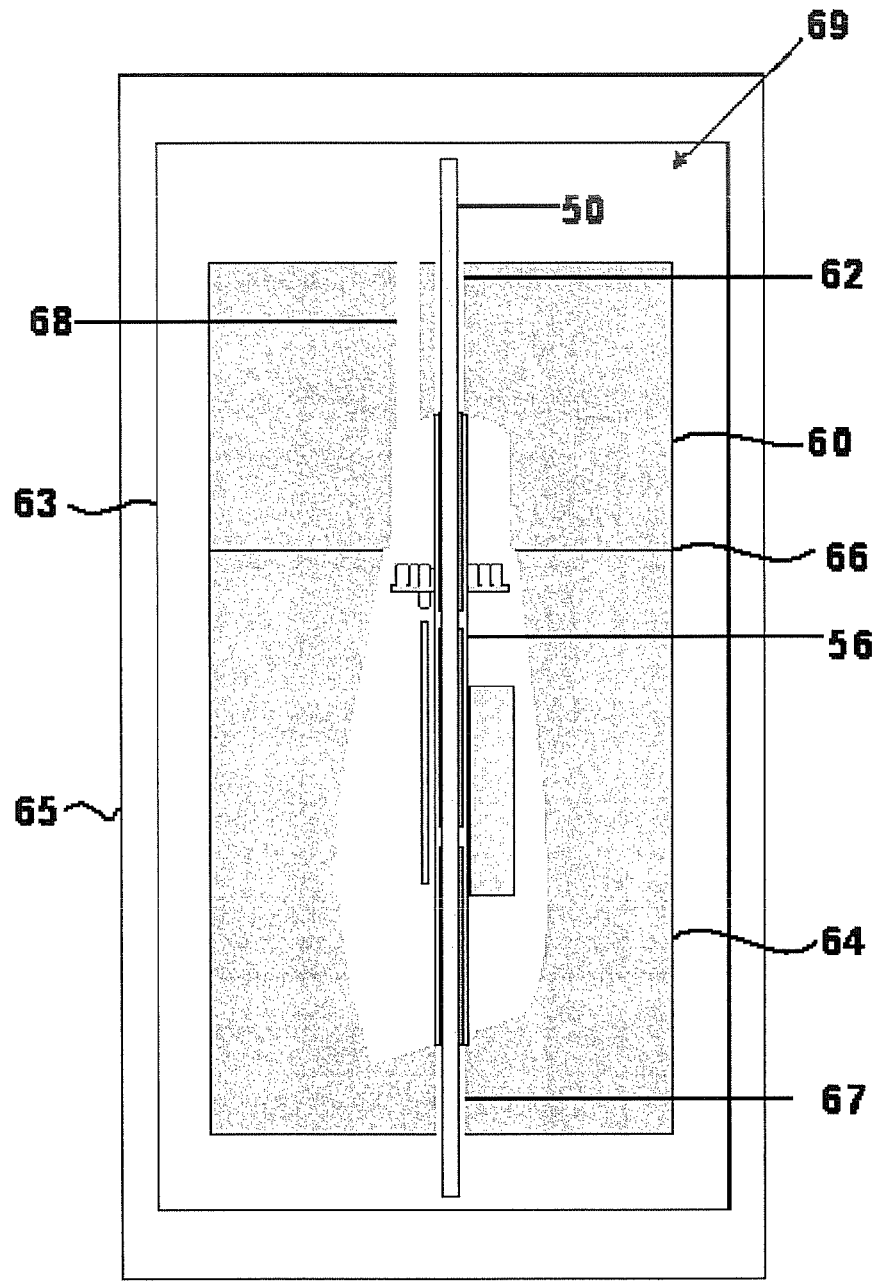
FIG. 5 depicts an embodiment of a mold assembly for manufacturing the light emitting fishing lure.

Now referring to FIG. 5, an embodiment of mold assembly 69 is depicted. Assembly begins by locating electrical assembly 56 in lower mold 64 and upper mold 60, which are joined at mold seam 66. Mold seam 66 is oriented such that any casting imperfections will have the least impact on the outside surface of the lure head.

The electrical assembly 56 is first positioned in lower mold 64 such that manufacturing support rod 50 extends through the lower support rod guide 67. The upper mold 60 is placed over electrical assembly 56 such that manufacturing support rod 50 extends through upper support rod guide 62. Lower mold 64 and upper mold 60 are pressed together to prevent leakage of liquid urethane casting material through mold seam 66.

Liquid urethane casting material, which encapsulates electric assembly 56, is poured into mold assembly 69 through pour hole 68. Afterward, mold assembly 69 is placed in pressure container 63, that is pressurized to approximately 45 pounds per square inch. Pressure container 63 containing mold assembly 56 is then placed in oven 65 at 130 degrees Fahrenheit for a four hour curing time.

After sufficient curing time during which the liquid urethane casting material becomes solid, pressure container 63 is removed from oven 65 and mold assembly 69 is removed from pressure container 63. Lower mold 64 and the upper mold 60 are then separated at mold seam 66 and the molded lure head is removed.

Manufacturing is completed by removing manufacturing support rod 50 from the molded lure head, which leaves a cylindrical lure cavity that is formed by charging terminal 16, enable terminal 20 and ground terminal 28, free of casting material and exposed.

While these embodiments have been described with emphasis on the embodiments, it should be understood that within the scope of the appended claims, the embodiments might be practiced other than as specifically described herein.

What is claimed is:

1. A light emitting fishing lure comprising:
   a. a translucent lure head comprising:
      an exposed cylindrical lure cavity passing longitudinally through the translucent lure head and an outside surface of the translucent lure head;
      wherein the exposed cylindrical lure cavity accommodates water when the light emitting fishing lure is submerged in water;
      a charging terminal located within the exposed cylindrical lure cavity;
      a charging circuit encapsulated by the translucent lure head, spaced from the exposed cylindrical lure cavity and in electrical communication with the charging terminal;
      an enable terminal located within the exposed cylindrical lure cavity and electrically isolated from the charging terminal;
      a ground terminal located within the exposed cylindrical lure cavity and electrically isolated from the charging terminal an from the enable terminal, wherein the ground terminal is in electrical communication with the charging circuit;
      an energy source encapsulated by the translucent lure head;
      a light emitting circuit board encapsulated by the translucent lure head;
      a convex lens formed by the outside surface of the translucent lure head;
   b. a leader secured to a fishing line and extending through the charging terminal, the enable terminal, and the ground terminal, in the exposed cylindrical lure cavity and connecting to a fish hook;
   c. a lure skirt attached to the translucent lure head;
   wherein, as the exposed cylindrical lure cavity accommodates water, an electrical circuit between the charging terminal, the enable terminal, and the ground terminal is thereby completed by the water.

2. The light emitting fishing lure of claim 1, wherein the energy source is replaceable.

3. The light emitting fishing lure of claim 2, wherein the energy source is at least one battery.

4. The light emitting fishing lure of claim 1, wherein the energy source is rechargeable.

5. The light emitting fishing lure of claim 4, wherein the energy source is at least one nickel metal hydride battery or at least one lithium ion battery.

6. The light emitting fishing lure of claim 1, wherein the translucent lure head further comprises at least one light emitting diode.

7. The light emitting fishing lure of claim 6, wherein the translucent lure head is faceted to disperse light emitted by the at least one light emitting diode.

8. The light emitting fishing lure of claim 1, wherein the translucent lure head contains shapes molded in cabochon.

9. The light emitting fishing lure of claim 6, wherein the translucent lure head comprises: an excitation circuit for controlling the illumination of the at least one light emitting diode.

10. The light emitting fishing lure of claim 9, wherein the excitation circuit controls the illumination of the at least one light emitting diode to illuminate continuously or to flash at least one rate.

11. The light emitting fishing lure of claim 9, wherein the excitation circuit controls the illumination of the at least one light emitting diode to illuminate in a sequence or pattern.

12. The light emitting fishing lure of claim 9 further comprising encapsulating material disposed around the excitation circuit.

13. The light emitting fishing lure of claim 1, wherein the translucent lure head is at least partially tinted at least one color.

14. The light emitting fishing lure of claim 1, wherein the lure skirt is tinted at least one color.

15. The light emitting fishing lure of claim 6, wherein the translucent lure head is at least partially tinted with phosphorescent material to enhance light emitted by the at least one light emitting diode.

16. The light emitting fishing lure of claim 6, wherein the lure skirt is tinted with phosphorescent material to enhance light emitted by the at least one light emitting diode.

17. The light emitting fishing lure of claim 1, wherein the light emitting fishing lure automatically activates when submerged in water.

18. The light emitting fishing lure of claim 14, wherein the charging circuit activates when the light emitting fishing lure is connected to a power supply.

19. The light emitting fishing lure of claim 1, wherein the charging terminal, the enable terminal, and the ground terminal are partially encapsulated by the translucent lure head for protecting the charging terminal, the enable terminal, and the ground terminal.

* * * * *